(12) United States Patent
Garg et al.

(10) Patent No.: US 9,916,618 B2
(45) Date of Patent: *Mar. 13, 2018

(54) AUCTION OF MULTIPLE HETEROGENEOUS ITEMS AMONG MULTIPLE BUYERS AND SELLERS USING SOFTWARE AGENTS LINKED VIA A COMMUNICATION NETWORK

(71) Applicant: EBAY INC., San Jose, CA (US)

(72) Inventors: Rahul Garg, Ghaziabad (IN); Debasis Mishra, Madison, WI (US)

(73) Assignee: Ebay, Inc., San Jose, CA (US)

(*) Notice: Subject to any disclaimer, the term of this patent is extended or adjusted under 35 U.S.C. 154(b) by 1012 days.

This patent is subject to a terminal disclaimer.

(21) Appl. No.: 13/725,662

(22) Filed: Dec. 21, 2012

(65) Prior Publication Data

US 2013/0117145 A1  May 9, 2013

Related U.S. Application Data

(60) Continuation of application No. 12/194,572, filed on Aug. 20, 2008, now Pat. No. 8,352,325, and a
(Continued)

(51) Int. Cl.
*G06Q 30/06*  (2012.01)
*G06Q 30/08*  (2012.01)
(Continued)

(52) U.S. Cl.
CPC .......... *G06Q 30/08* (2013.01); *G06Q 30/02* (2013.01); *G06Q 30/0601* (2013.01);
(Continued)

(58) Field of Classification Search
CPC .............................. G06Q 30/06; G06Q 30/08
(Continued)

(56) References Cited

U.S. PATENT DOCUMENTS 5,835,896 A   11/1998  Fisher et al.
5,890,138 A   3/1999  Godin et al.
(Continued)

OTHER PUBLICATIONS

Allen, Dwight L, Jr; Hillstrand, Kris. Utility dot.com/future. Electric Perspectives 25.4 (Jul./Aug. 2000): 22-38, downloaded from ProQuestDirect on the Internet on Jul. 24, 2016, 17 pages.*
(Continued)

*Primary Examiner* — James Zurita

(57) ABSTRACT

A method, system and computer program product for conducting an online auction of a plurality of heterogeneous items between a plurality of selling and potential purchasing parties. The method includes the steps of accepting an offer in respect of an item, accepting one or more subsequent offers that is/are preferable to a previously accepted offer, and rejecting the previously accepted offer. While the offer/s is/are binding on a party making the offer, acceptance of the offer/s is/are not binding on a party accepting the offer. Classes of "seller strategies", for offering items to potential purchasing parties, and "buyer strategies", to decide which offers to accept, are also disclosed. As a result of the interaction of the buyer and seller strategies, the auction mechanism converges to an allocation of items to buyers at particular prices and assists in discovering a free and fair competitive equilibrium price.

20 Claims, 7 Drawing Sheets

Related U.S. Application Data division of application No. 10/139,090, filed on May 3, 2002, now Pat. No. 7,472,076.

(51) Int. Cl.
  *G06Q 30/02* (2012.01)
  *G06Q 40/04* (2012.01)
  *G06Q 50/18* (2012.01)

(52) U.S. Cl.
  CPC ......... *G06Q 30/0617* (2013.01); *G06Q 40/04* (2013.01); *G06Q 50/188* (2013.01)

(58) Field of Classification Search
  USPC .............................................. 705/26.1, 27.1
  See application file for complete search history.

(56) References Cited

U.S. PATENT DOCUMENTS

| | | | |
|---|---|---|---|
| 6,976,005 B1 | 12/2005 | Bansal et al. | |
| 7,062,452 B1 * | 6/2006 | Lotvin | G06Q 20/02 705/14.4 |
| 7,472,076 B2 | 12/2008 | Garg et al. | |
| 7,664,672 B1 | 2/2010 | Walker et al. | |
| 7,970,652 B1 * | 6/2011 | Woolston | G06Q 20/10 705/26.1 |
| 8,352,325 B2 | 1/2013 | Garg et al. | |
| 8,990,832 B2 * | 3/2015 | Viswanath | 705/1.1 |
| 2002/0120552 A1 | 8/2002 | Grey et al. | |
| 2003/0041009 A1 | 2/2003 | Grey et al. | |
| 2003/0233305 A1 | 12/2003 | Solomon | |

OTHER PUBLICATIONS

Collins, John; Bilot, Corey; Gini, Maria, Decision Processes in Agent-Based Automated Contracting, IEEE Internet Computing 5.2 (Mar. 2001): 61-72, downloaded from ProQuestDirect on the Internet on Jul. 24, 2016, 28 pages.*

Gul et al., "The English Auction with Differentiated Commodities", Journal of Economic Theory, May 2000, pp. 66-95.

Wurman et al., "The Michigan Internet AuctionBot: A Configurable Action Server for Human and Software Agents," Proceedings of the 2nd International Conference on Autonomous Agents, 1998, Agents '98, pp. 7.

Shapley et al., "The Assignment Game I: The Core," International Journal of Game Theory, 1972, pp. 111-130.

Demange et al., "Multi-item Auctions," Journal of Political Economy, 1984, pp. 863-872.

Bertsekas, Dimitri P., " Auction Algorithms for Network Flow Problems: A Tutorial Introduction," Computational Optimization and Applications, 1992, pp. 1-55.

Crawford et al., "Job Matching with Heterogeneous Firms and Workers," Econometrica, Mar. 1981, pp. 437-450, vol. 49 No. 2.

Kelso et al., "Job Matching, Coalition Formation, and Gross Substitutes," Econometrica, Nov. 1982, pp. 1483-1504, vol. 50 No. 6.

Gul et al., "Walrasian Equilibrium with Gross Substitutes," Journal of Economic Theory, Feb. 1999, pp. 95-124.

Leonard, Herman B., "Elicitation of Honest Preferences for the Assignment of Individuals to Positions," Journal of Political Economy, 1983, pp. 461-479.

Vickrey, William, "Counterspeculation, Auctions, and Competitive Sealed Tenders," the Journal of Finance, Mar. 1961, vol. 16 Issue 1, pp. 8-37.

Bansal et al., "Efficiency and Price Discovery in Multi-item Auctions," IBM India Research Lab, New Delhi, India.

Bansal et al., "Simultaneous Online Independent Auctions with Discrete Bid Increments," IBM India Research Lab, IIT Campus, Hauz Khas, New Delhi, India.

Mishra et al., "Descending Price Multi-items Auctions," IBM (confidential) Internal Report, unpublished, New Delhi, India.

Emery, David., "Bricks and clicks the modern way David Emery looks at how the internet is shaking up the property market: [A Edition]" Emery, David. Evening Standard [London (UK)] Sep. 29, 2000, downloaded from ProquestDirect on the Internet on Aug. 30, 2012, pp. 4.

Hasselbring et al., "Languages for electronic business communication: State of the art", Industrial Management + Data Systems, Wembley: 2001. vol. 101, Issues 5/6; p. 217, downloaded from ProQuestDirect on the Internet on Jul. 29, 2012, 15 pages.

U.S. Appl. No. 10/139,090, 312 Amendment filed Nov. 5, 2008, 13 pages.

U.S. Appl. No. 10/139,090, Advisory Action dated Dec. 15, 2006, 3 pages.

U.S. Appl. No. 10/139,090, Amendment and Response filed Jun. 21, 2006, 9 pages.

U.S. Appl. No. 10/139,090, Amendment and Response filed Nov. 6, 2006, 15 pages.

U.S. Appl. No. 10/139,090, Amendment and Response filed May 31, 2007, 20 pages.

U.S. Appl. No. 10/139,090, Amendment and Response filed Oct. 10, 2007, 22 pages.

U.S. Appl. No. 10/139,090, Amendment and Response filed Apr. 29, 2008, 29 pages.

U.S. Appl. No. 10/139,090, Notice of Allowance dated Aug. 5, 2008, 6 pages.

U.S. Appl. No. 10/139,090, Office Action dated Dec. 29, 2005, 9 pages.

U.S. Appl. No. 10/139,090, Office Action dated Sep. 12, 2006, 16 pages.

U.S. Appl. No. 10/139,090, Office Action dated Apr. 18, 2007, 9 pages.

U.S. Appl. No. 10/139,090, Office Action dated Aug. 22, 2007, 13 pages.

U.S. Appl. No. 10/139,090, Office Action dated Jan. 9, 2008, 12 pages.

U.S. Appl. No. 10/139,090, Response to 312 amendment dated Nov. 25, 2008, 2 pages.

U.S. Appl. No. 12/194,572, Amendment and Response filed Apr. 25, 2012, 23 pages.

U.S. Appl. No. 12/194,572, Ex Parte Office Action dated Aug. 2, 2012, 6 pages.

U.S. Appl. No. 12/194,572, Notice of Allowance dated Sep. 6, 2012, 9 pages.

U.S. Appl. No. 12/194,572, Office Action dated Dec. 8, 2011, 13 pages.

* cited by examiner

US 9,916,618 B2

AUCTION OF MULTIPLE HETEROGENEOUS ITEMS AMONG MULTIPLE BUYERS AND SELLERS USING SOFTWARE AGENTS LINKED VIA A COMMUNICATION NETWORK

CROSS-REFERENCE

This application is a continuation of U.S. patent application Ser. No. 12/194,572 filed Aug. 20, 2008, which is a divisional of U.S. patent application Ser. No. 10/139,090 filed May 3, 2002, the complete disclosure of which, in its entirety, are herein incorporated by reference.

FIELD OF THE INVENTION

The present invention generally relates to the field of electronic business and more specifically to online auctions using software-based agents linked via a communication network.

BACKGROUND

The Internet is increasingly being used to conduct electronic business. Advertising is commonplace and many vendors use the Internet for the sale of products and services, including books and toys. Individuals use Internet-based online auction sites for selling a variety of goods that range from second hand books to rare collectible items.

The Internet has several advantages over the traditional media types. Firstly the reach of the Internet is much wider than any other traditional media type available. Thus, an item advertised for sale on the Internet is exposed to potentially more than a billion Internet users all over the world. Secondly, the Internet offers excellent search capabilities to users. State of the art search engines make it possible to type a few keywords and subsequently browse through a substantial amount of information present on the Internet that is related to these keywords. A user in search of a used car (e.g. a Honda Civic) may simply submit the phrase "for sale used Honda Civic" to a search engine to obtain a listing of used Honda Civic cars available for sale on the Internet. Thirdly, the Internet offers a relatively inexpensive way to communicate to users all over the world. Finally, the Internet connected with various public and private computer systems enables users to make use of software-based agents to perform many useful functions in an automated manner.

As a result, an increasing number of virtual electronic marketplaces are being setup on the Internet for the sale and purchase of goods and services. These marketplaces offer a variety of market mechanisms for negotiating contracts between buyers and sellers. The most common mechanisms currently used are fixed price sale, ascending price English auctions, descending price Dutch auctions, name-your-price and request-for-quotes.

In the fixed price sale mechanism, the seller publishes a fixed price for an item. Interested buyers may purchase the item by using an online payment method, such as a credit card or CyberCash, and by supplying a shipping address. In descending price Dutch auctions, sellers offer their items for sale beginning with a high initial price. A seller lowers the price of an item if buyers show no interest in the item. The price is lowered in a stepwise fashion until the, seller finds a buyer for the item.

In ascending price English auctions, the sellers list items for sale on an online Internet-based auction site. Potential buyers peruse the item details and place bids on items of interest. The buyers may place additional bids in case of being outbid by other buyers. At close of the auction, the buyer with highest bid wins the item at the final bid price, In the name-your-price mechanism, a seller supplies details of the item for which potential buyers can bid. After examining the details of the item, a buyer may make a bid for securing the item. If the bid amount is acceptable to the seller, a contract is concluded and the seller ships the item to the buyer after receiving the payment or payment information.

In the request-far-quotes mechanism, a buyer (typically a large corporate entity or a government body) interested in purchasing an item makes their intent public and calls on various parties to submit quotations for the item. Interested sellers submit offers for the sale of the item and the buyer selects the best offer.

The auction model used for FCC bandwidth auctions (www.fcc.gov) is called the multi-round simultaneous auction model. In this model, all the auctions start simultaneously and end simultaneously, when bidding on each of them stops. The model provides an opportunity to bid for more than one bandwidth license simultaneously, in order to enable a combination of licenses to be won by a bidder who values that combination the most.

Several other auction-like mechanisms having desirable properties have been proposed in research literature. Demange G. et al., in "Multi-item Auctions", Journal of Political Economy, 1984, 94(4):863-872, describe a generalization of ascending English auctions to multiple heterogeneous auctions. In this mechanism, each item is auctioned independently as an ascending open-cry auction, but all the auctions open and close simultaneously. The bidders place bids on items that provide a maximum surplus. Demange et al. showed that this mechanism leads to a final allocation that can be made substantially close to the minimum competitive equilibrium price. Bertsekas D. P., in "Auction Algorithms for Network Flow Problems: A Tutorial Introduction", Computational Optimization and Applications, 1992, 1:7-66, also discusses properties of this auction mechanism. Bansal V. and Garg. R., in "Efficiency and Price Discovery in Multi-item Auctions", ACM SigEcom Exchanges, 2(1), Winter 2001, briefly discuss multi-item auctions.

Crawford V. P. and Knoer E., in "Job Matching with Heterogeneous Firms and Workers", Econometrica, March 1981, 49(2):437-450, describe a mechanism in the context of firms and workers where workers are assigned to firms. A mechanism (called salary adjustment process) is described that converges to an equilibrium assignment and competitive prices (salaries). Kelso A. S. and Crawford V. P., in "Job Matching, Coalition Formation, and Gross Substitutes", Econometrica, November 1982, 50(6):1483-1504, extend this mechanism to the case where the bidders have more general demand (called gross substitute). Gul F. and Stacchetti E., in "Walrasian Equilibrium with Gross Substitutes", Journal of Economic Theory, July 1999, 87(1):95-124, and in "The English Auction with Differentiated Commodities," Journal of Economic Theory, May 2000, 92(1):66-95, describe a similar auction procedure for generic bidder demands called gross substitutes.

Leonard H. B., in "Elicitation of Honest Preferences for the Assignment of Individuals to Positions", Journal of Political Economy, 1983, 91:461-479, considers a sealed bid mechanism for allocating items to bidders. Vickery W., in "Counterspeculation, Auctions, and Competitive Sealed Tenders", Journal of Finance, 1961, 16:8-37, describes a "second price" sealed bid auction mechanism for a single item.

Implementation of the above-described auction mechanisms in Internet-based marketplaces has been limited. However, more traditional and/or simpler mechanisms for selling items have been implemented in various marketplaces. U.S. Pat. No. 5,890,138, issued to Godin et al. on Mar. 30, 1999 and U.S. Pat. No. 5,835,896, issued to Fisher et al. on Nov. 10, 1998, each present a method of conducting online auctions, which enables users to participate using computers connected to the auction system via a computer or communications network.

Examples of online auction web sites on the World Wide Web (WWW) include www.auctions.yahoo.com, and www.ebay.com. The experimental auction server AuctionBot at the University of Michigan, Ann Arbor, USA, supports Vickrey auctions, (m+1)st-price auctions, mth-price auctions, continuous double auctions and chronological match auctions (e.g. http://auction.eecs.umich.edu) and is described by Wellman, P. R., Wellman M. P. and Walsh W. E. in "The Michigan Internet AuctionBot: A Configurable Auction Server for Human and Software Agents", Proceedings of the 2nd International Conference on Autonomous Agents 1998, (Agents '98). Web sites such as www.amazon.com and www.walmart.com have implemented the fixed price sale mechanism. Web sites such as www.priceline.com have implemented the name your price mechanism for airline tickets and other travel related services. Some of these auction sites provide users with a capability to use very simple automated software-based agents, acting on behalf of those users, to place bids. Proxy bidding at the auction web site www.ebay.com is one such example.

In view of the foregoing, a need exists for the online implementation of multi-item generalization of auction mechanisms.

SUMMARY

According to aspects of the present invention, there are provided a method, a system, and a computer program product for conducting an auction of a plurality of heterogeneous items between a plurality of selling and potential purchasing parties. The method includes the steps of accepting an offer in respect of an item, accepting one or more subsequent offer/s at a revised price that is/are preferable to a previously accepted offer, and rejecting the previously accepted offer. Acceptance of each of the offers is not binding on the accepting party. One or more of the steps is/are performed using software-based agents acting on behalf of the parties, which are hosted on terminals connected via a communication network. The terminals may include, but are not limited to, computer systems, electronic terminals, personal digital assistants (PDA's), and mobile telephones.

Preferably, each of the offers is only accepted if the offer provides a surplus of at least a minimum surplus amount, wherein the surplus is a function of the specified price. Furthermore, each offer that provides an increased surplus compared to a surplus provided by a previously accepted offer is accepted. A surplus may be defined as the difference between the specified price and accepting party's valuation of the item, the difference between the accepting party's valuation of the item and the current price of the item; the ratio of the accepting party's valuation of the item to the specified price, the ratio of the specified price to the accepting party's valuation of the item, a function of the current price of the item that increases as the current price increases, or a function of the current price of the item that increases as the current price decreases.

Preferably, acceptance of the offer/s is/are binding on a party accepting the offer/s when the auction closes. The auction may open and close at specified times. Alternatively, the auction may start at a specified time and close when no further offers are made for a specified period of time.

The method can include the additional steps of making a binding offer to purchase the item at a specified initial price and making a subsequent binding offer to purchase the item at an increased price if a current offer is not accepted within a specified period of time and if the increased price is less than a specified maximum price. Optionally, a subsequent binding offer to purchase the item at an increased price can be made, if a current offer is rejected by each party the offer was made to.

The method can include the additional steps of making a binding offer to sell the item at a specified initial price, making a subsequent binding offer to sell the item at a reduced price if a current offer is not accepted within a specified period of time, and withdrawing the item from the auction if the reduced price is lower than or equal to a specified reserve price. Optionally, a subsequent binding offer to sell the item at an reduced price can also be made, if a current offer is rejected by each party the offer was made to.

The system and computer program product include processing means and computer program code means, respectively, for performing the foregoing method steps.

BRIEF DESCRIPTION OF THE DRAWINGS

The foregoing and further aspects and advantages of the present invention will become more apparent from a consideration of the following description, the appended claims, and the accompanying drawings in which:

DETAILED DESCRIPTION

Figure 1:
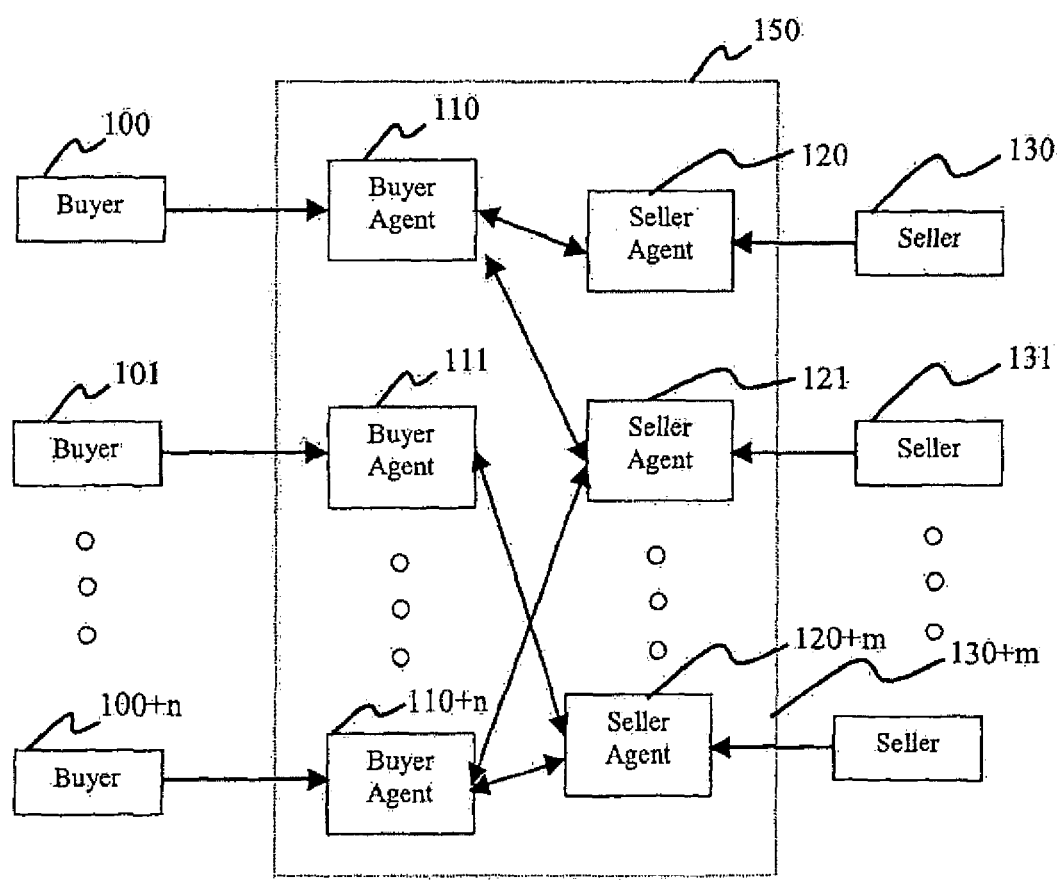
FIG. 1 is a block diagram of a system architecture, wherein a single online auction site hosts buyer agents and seller agents, according to an embodiment of the invention.

The term 'item' is intended to represent either a single good, multiple goods bundled together, a single service, multiple services bundled together, or any combination thereof. The term 'offer' is intended to represent the willingness of a seller to sell an item at a specified price.

Software-based agents act on behalf of human participants and may reside on computer systems or on any type of stationary or mobile electronic terminals belonging to buyers, sellers, various third parties (including public servers), commercial service providers or on computer systems of auction sites. In the case that a software-based agent is not hosted on a bidder's computer system or terminal, the agent is linked to the bidder's computer system or terminal via a communications network. Typical communications networks include various types of wired and wireless networks such as wireless local area network (Wireless LAN), wireless metropolitan area networks (Wireless MAN), satellite, wireless wide-area networks (satellite based or others), telecommunications networks, leased lines, virtual leased lines, virtual private networks, intranets, local area networks (LANs), metropolitan area networks (MAN), wide area networks (WAN), Internet or Internet-based networks, and any combination of the foregoing. In particular, the different buyers' agents may reside at several auction sites, publishing their intent to accept offers from sellers of a class of items. Similarly, different sellers' agents may reside on different auction sites, searching for buyers interested in purchasing their items.

The method, system and computer program product described hereinafter include a set of "auction rules" to be followed by multiple buyers and multiple sellers participating in an auction, a class of "seller strategies" to offer items to the buyers, and a class of "buyer strategies" to decide which offers to accept. As a result of the interaction of the buyer and seller strategies, the auction mechanism converges to an allocation of items to buyers at particular prices. For certain specific buyer and seller strategies, the resulting allocation and prices have several desirable properties. Firstly, the allocation is nearly an efficient allocation (i.e. the allocation maximizes the total value in the system). Secondly, the prices discovered are close to maximally competitive prices. The price of an item is maximally competitive if there are no other competitive prices for a particular item that can be increased (A rigorous definition of competitive equilibrium prices and maximum and minimum competitive equilibrium prices is provided by Lloyd S. Shapley and Martin Shubik in their article entitled "The Assignment Game I: The Core", International Journal of Game Theory, 1972, 1(2):111-130).

For simplicity of exposition, a generic descending price auction mechanism for allocating items to buyers and that, with certain specific conditions, leads to nearly efficient allocation of items and fair and competitive price discovery is described hereinafter. The described auction mechanism may advantageously provide sellers with an opportunity to obtain improved prices compared to the prices obtainable in ascending price English or other auction mechanisms. For a buyer, the auction rules advantageously provide the flexibility to reject a previously accepted offer in the event a better offer is received from a different seller.

In a descending price auction, sellers make offers to buyers that may be accepted or rejected by the buyers. This auction mechanism assists in discovering a free and fair competitive equilibrium price that is favourable to sellers. However, the method, system and computer program product disclosed can equally be applied to other auction or negotiation mechanisms. For example, an ascending price auction wherein buyers make offers that may be accepted or rejected by sellers.

Consider a scenario with n buyers interested in purchasing items from in sellers. For simplicity of exposition, assume that each player is interested in purchasing at most one item and each seller has exactly one item to sell. A more general embodiment of the invention, where each buyer might be interested in purchasing one or more items and each seller may have one or more items to sell, is described hereinafter.

Each buyer attaches a value to each item the buyer is interested in purchasing, which represents the maximum price that the buyer is willing to pay for the item. Similarly, each seller attaches a value to the item to be sold, which represents the cost incurred by the seller in obtaining the item. The sellers also attach a reserve price for their items, which represents the minimum amount a seller expects to receive for an item. It should be assumed that buyers have enough money/budget to buy an item from any of the sellers.

Auction Rules

The auction is conducted according to the following rules. The auction of multiple items by multiple sellers, opens at a pre-specified time when all the potential buyers (or the software agents representing the potential buyers) are expected to be present. A seller (or a software agent acting on behalf of a seller) may offer an item to any buyer (or software agent acting on behalf of a buyer) at any price. Buyers can tentatively accept or reject the offer. If a buyer tentatively accepts an offer, the seller and the buyer are said to be committed to each other. If a buyer, who is already committed, receives an alternative offer that is preferable to the offer already committed to, the buyer can switch from the accepted offer (by rejecting the accepted offer) to the new offer (by tentatively accepting the new offer). The buyer remains committed in the process whereas the seller of the earlier accepted offer becomes uncommitted. An offer is binding on the seller. Unlike the buyers, a seller cannot withdraw an offer unless the offer has been rejected by the buyer. A seller may offer items to buyers only if the seller is not committed (i.e. all the seller's earlier offers have been eventually rejected).

An uncommitted seller may withdraw an item from the auction at any point in time and leave the auction if the seller is unable to sell the item for an amount greater than or equal to the reserve price. The auction closes either at a specified time or when no more offers are made (i.e. every seller is either committed or has withdrawn their item from the auction). After closing, the committed buyers are obliged to purchase the item/s from their respective committed sellers at the last offer prices.

Decreasing Price Offer (DPO) Strategy

A seller strategy, called the Decreasing Price Offer (DPO) strategy is a generalization of a seller's behavior in Dutch auctions. The DPO strategy is described hereinafter.

Each seller offers an item to the buyers, independently. The seller begins with a high initial price and lowers the price by at least a minimum price decrement, as described hereinafter, if there is no demand for the item. Initially, after the start of the auction, the seller offers the item to each of the buyers one-by-one at the initial high price. The order in which the offers arc made to the buyers is not fixed and is immaterial. As soon as a buyer accepts the seller's offer, the seller becomes committed and consequently stops offering the item. If a committed buyer switches from the seller's item, the seller again starts offering the item at the current price to the remaining buyers. If no buyer accepts the seller's offer at the current price, the seller lowers the price by at least the minimum price decrement and re-offers the item.

Alternatively, a seller may simply announce a price for an item, which amounts to making an offer to every buyer in the system. Any buyer who does not respond to the offer within a specified time period is assumed to have rejected the offer. A buyer who intends to tentatively accept the offer is expected to respond to the offer within a specified time period. The seller may arbitrarily select and notify one of the buyers who tentatively accepted the seller's offer. The buyer that receives the seller's notification becomes committed to the seller. In the event the buyer was committed earlier, the buyer un-commits from the previous seller by way of sending a notification. The consequently uncommitted seller then re-offers the item at the same price to ascertain whether any other buyer is interested in the offer. If the offer is not accepted within a fixed time period, the seller lowers the price by the minimum price decrement and re-offers the item at the reduced price. For each seller, this process continues until there is either a committed buyer and the auction ends, or the price reaches the reserve price and the seller withdraws the item and leaves the auction.

A seller may set a reserve price that is different to the seller's valuation of an item. If a seller wants a minimum surplus t, the seller will set a reserve price r that gives the seller a surplus of t. In general, a seller's reserve price will increase as the seller's minimum surplus increases, A Decreasing Price Offer (DPO) strategy followed by the seller of an item is denoted as DPO(t) if the seller's minimum surplus amount is t. For instance, when the seller's surplus is linear in price, surplus s is given by the equation s=p−v where v is the seller's valuation of the item (cost of securing the item) and p is the price at which the seller is able to sell the item. In this case, the reserve price for a minimum surplus amount t is given by $p_r = v + t$. If a seller sets a reserve price $p_r$ equal to the seller's valuation v, then the corresponding surplus t=0 and the corresponding DPO strategy is DPO(0). Thus, DPO generally refers to a class of strategies with different minimum surplus amounts.

Local Surplus Increasing (LSI) Strategy

An initial surplus amount s is associated with each buyer. If a buyer is not committed to any item, the buyer accepts any offer that provides at least surplus s. However, even if already committed to an offer, the buyer accepts any other offer of an item that provides a greater surplus than the surplus provided by the item already committed to. By following this strategy, a buyer's surplus is always increased by positive amounts with every subsequent offer accepted. This strategy is denoted as a Local Surplus Increasing (LSI) strategy. More specifically, if a buyer has an initial surplus amount s, the strategy is denoted as LSI(s). If s=0, then the corresponding strategy of the buyer is LSI(0). Thus, LSI generally refers to a class of strategies with different initial surplus amounts.

In general, a buyer's surplus on an item is a decreasing function of the price at which the item is bought. For instance, if the buyer surplus (denoted as s) is linear in the price then the buyer surplus on an item, at a time t, is given by the equation $s = v - p_t$, where v is the buyer's valuation of the item, and PI is the item's price at time t.

According to LSI strategy, a buyer can never be committed to more than one offer at the same time during the auction. As soon as a buyer receives an offer that provides an increased surplus, the buyer un-commits from the current offer and accepts the new offer. Offers that provide a lower surplus than a current surplus are rejected while a buyer waits for item prices to fall. Thus, buyers are guaranteed to obtain a surplus at least equal to the buyer's initial surplus, provided an offer is accepted and an item is secured.

Specific Embodiments of Single and Multiple Online Auction Sites

FIG. 1 is a block diagram showing an embodiment of a single online auction site that hosts buyer agents 110, 111, . . . 110+n, representing buyers 100, 101, . . . 100+n, respectively, and seller agents 120, 121, . . . 120+m representing sellers 130, 131, . . . 130+m, respectively. The buyer and seller agents are typically implemented in software for execution on the computer hardware of an online auction site.

Figure 2:
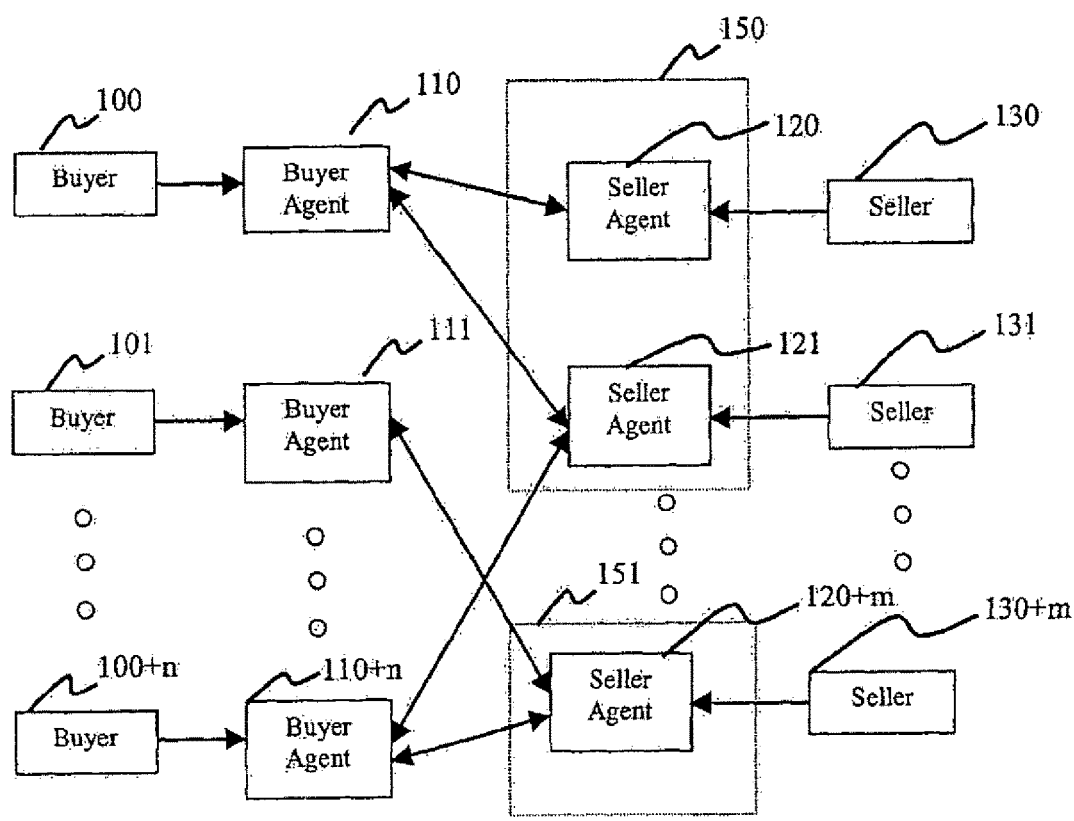
FIG. 2 is a block diagram of a system architecture, wherein seller agents are hosted on multiple online auction sites and buyer agents are hosted on different computer systems to those that host the seller agents, according to an embodiment of the invention.

FIG. 2 is a block diagram showing an alternative embodiment wherein the sellers 130,131, . . . 130+m list items for auction on different online auction sites 150 and 151. The number of online auction sites is not limited to two, however, and may extend to any convenient number. The auction sites 150 and 151 also host the software-based seller agents 120, 121, . . . 120+m, which represent the sellers 120, 121, . . . 120+m, respectively. The buyers 100, 101, . . . 100+n are represented by the buyer agents 110, 111, . . . 110+n, respectively, which may be hosted on the online auction sites 150 and 151, a buyer's Internet Service Provider's (ISP's) computer, or a buyer's Personal Computer (PC) or Personal Digital Assistant (PDA).

Figure 3:
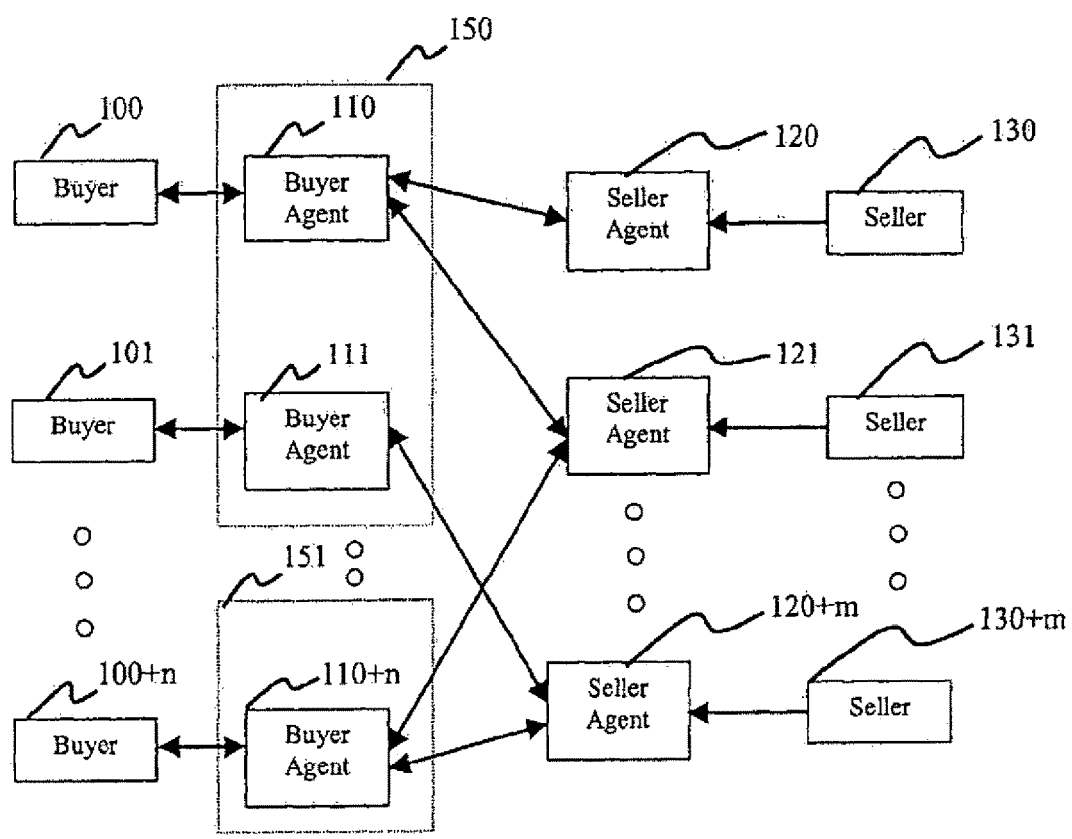
FIG. 3 is a block diagram of a system architecture, wherein buyer agents are hosted on multiple online auction sites and seller agents are hosted on different computer systems to those that host the buyer agents, according to an embodiment of the invention.

FIG. 3 is a block diagram showing an alternative architecture to FIG. 2 wherein the buyers 100, 101, . . . 100+n announce their intention to purchase an item and request quotations (invite offers) from prospective sellers 130, 131, . . . 130+m. The request for quotations is published on online auction sites 150 and 151. The number of online auction sites is not limited to two, however, and may extend to any convenient number. The online auction sites 150 and 151 also host the buyer agents 110, 111, . . . 110+n that represent the buyers 100, 101, . . . 100+n, respectively. Alternatively, the buyer agents 110, 111, . . . 110+n may be hosted on a seller's Internet Service Provider's (ISP's) computer or on a seller's Personal Computer (PC) or Personal Digital Assistant (PDA).

Generic Descending Price Auction Algorithm

Figure 4:
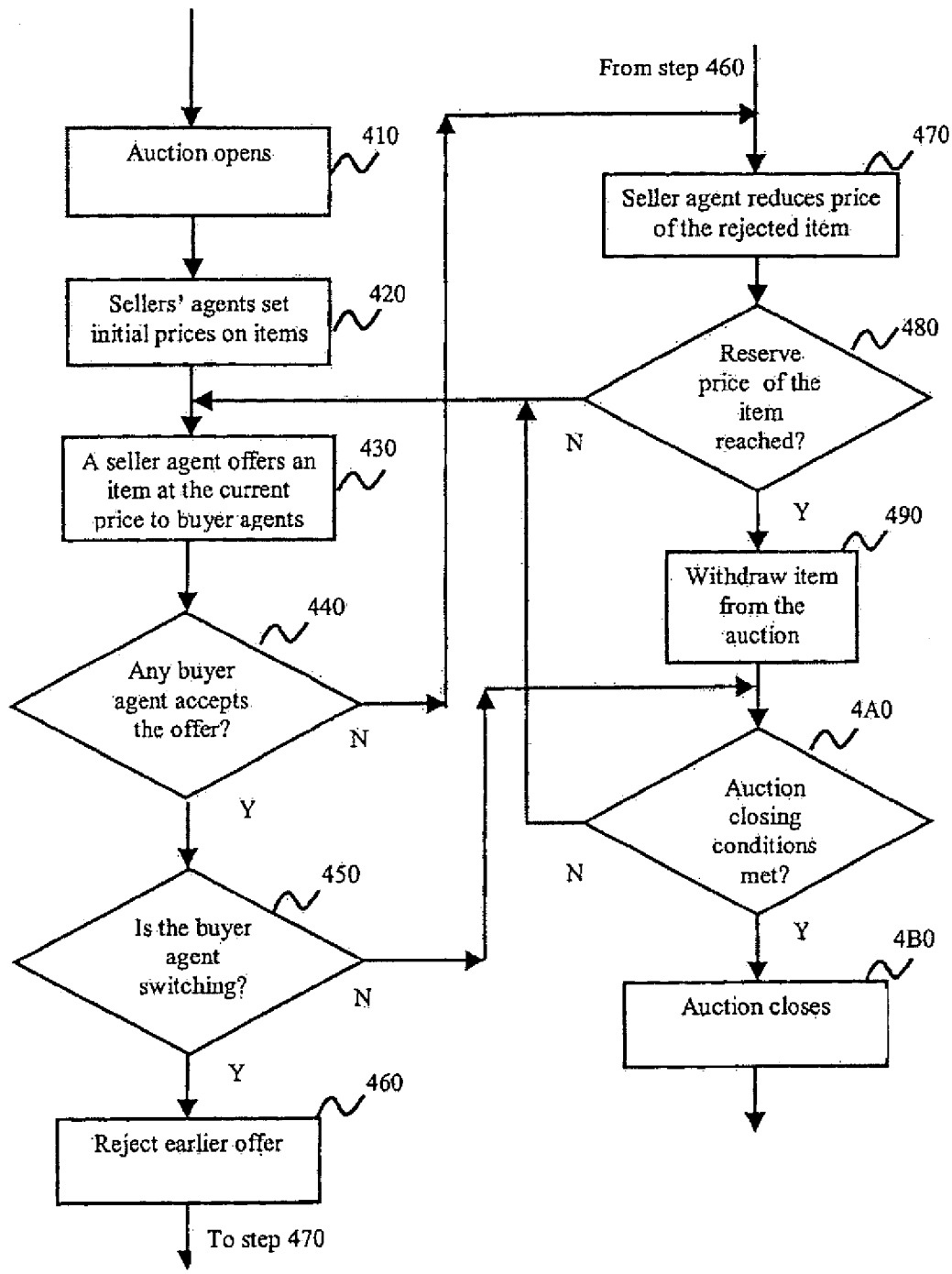
FIG. 4 is a flow diagram of an auction mechanism that can be practised in accordance with embodiments of the invention.

FIG. 4 is a flow diagram of a generic descending price auction mechanism that can be practised in accordance with different embodiments of the invention.

The buyer agents 110, 111, . . . 110+n follow a Local Surplus Increasing (LSI) strategy on behalf of their respective buyers 110, 111, . . . 110+n. The seller agents 120, 121, . . . 120+m follow a Decreasing Price Offer (DPO) strategy on behalf of their respective sellers 130, 131, . . . 130+m.

At step 410, the auction opens. Next, at step 420, each respective seller agent 120, 121, . . . 120+m sets an initial high price on the seller's item. At step 430, one or more seller agents 120, 121, 120+m offer their item/s at the current price/s to the interested buyer agents 110, 111, 110+n.

Upon receipt of an offer from a seller agent 120, 121, . . . 120+m, each buyer agent 110, 111, . . . 110+n decides whether to accept or reject the offer at decision step 440. This decision is made by the buyer agents 110, 111, . . . 110+n in accordance with an LSI strategy and information relating to the perceived value of the item and the initial surplus amount as specified by the respective buyers 100, 101, . . . 100+n.

If a seller agent's offer is accepted (Y) by any of the buyer agents 110, 111, . . . 110+n, at decision step 440, and the buyer switches from an earlier accepted offer (Y), at conditional step 450, the buyer rejects the earlier offer at step 460 and processing continues at step 470.

For the case of a buyer agent 110, 111, . . . 110+n that accepted an offer (Y), at decision step 440, and that did not accept an earlier offer, the condition of step 450 cannot not be satisfied. In this case, processing continues at decision step 4AO, where auction closing conditions are checked.

If a seller agent's offer is not accepted (N) by any of the buyer agents 110, 111, . . . 110+n, at decision step 440, the seller agent 120, 121, . . . 120+m reduces the price of the rejected item by at least a specified minimum price decrement, at step 470.

At condition step 480, the seller agent 120, 121, . . . 120+m determines whether the reserve price of the item has been reached. This condition check is performed according to the DPO strategies described hereinbefore. If the reserve price has been reached (Y), the seller agent 120, 121, . . . 120+m withdraws the item from auction at step 490 and leaves the auction. If the auction closing conditions are met, at condition step-4A0, the auction closes at step 4BO. The auction closing conditions are checked according to the auction rules described hereinbefore.

Figure 5:
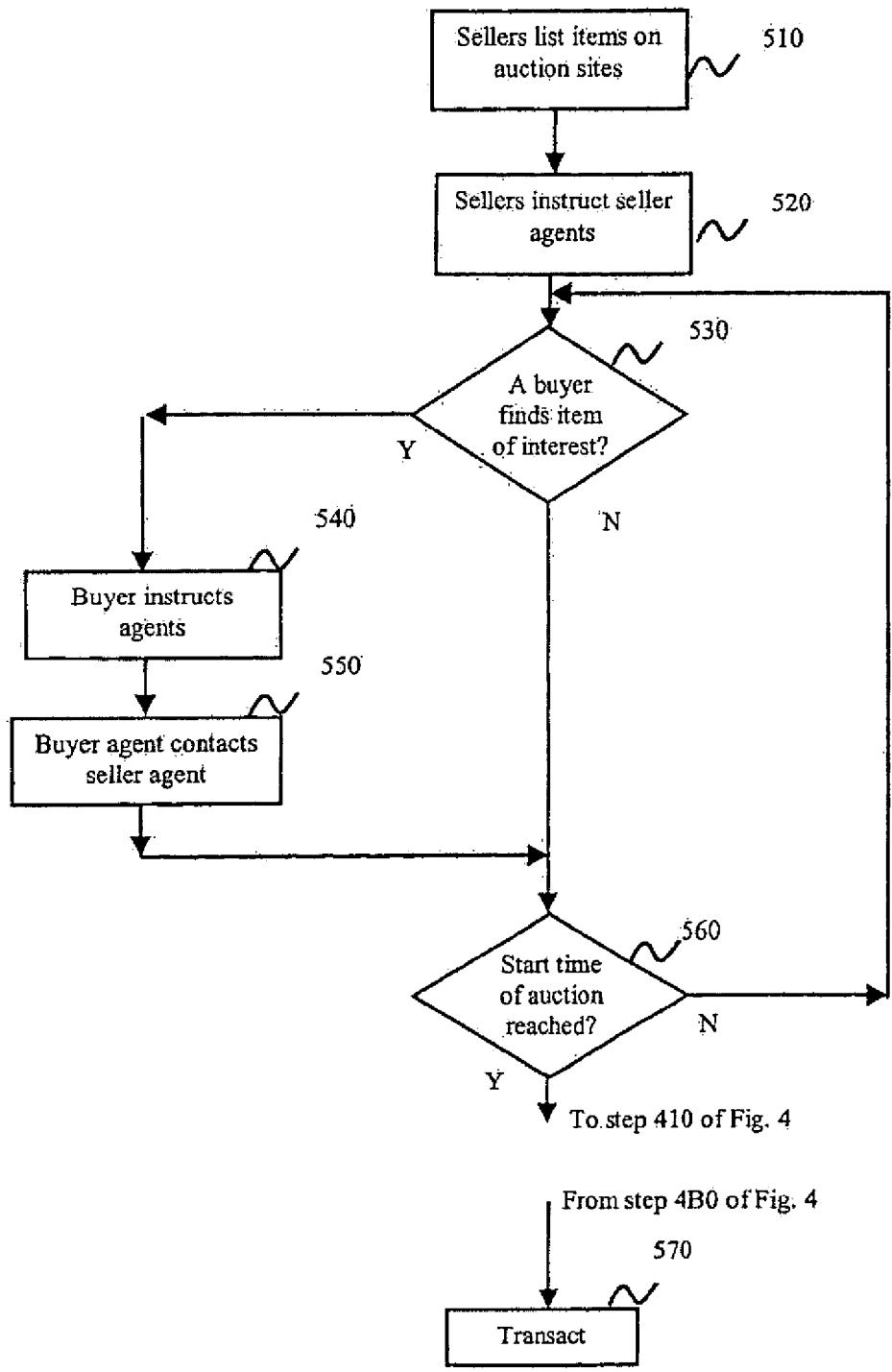
FIG. 5 is a flow diagram of an exemplary auction mechanism that can be practised with the system architecture of FIG. 1 and FIG. 2.

If reserve price has not been reached (N), at condition step 480, or the auction closing conditions are not met (N), at condition step 4AO, processing reverts to step 430, where one or more uncommitted seller agents 120, 121, . . . 120+n offer their item/s to interested buyer agents 110, 111, . . . 110+n, at the current prices of the item/so Embodiments Employing the Generic Auction Algorithm FIG. 5 is a flow diagram of an exemplary auction mechanism that can be practiced with the system architecture of FIG. 1 and FIG. 2.

At step 510, the sellers 130, 131, . . . 130+m list items for sale on online auction web site/s 150, 151, . . . using conventional methods practised in online auction sites. A seller may do this by running a world-wide-web browser such as Netscape™ Communicator Version 4.7 on a personal computer (PC) with a modem, connected to the Internet using the services of an Internet Service Provider (ISP). The online auction sites 150, 151, . . . , may be implemented using a server hardware system such as RS16000™, ASI400™ etc., connected to the Internet using services of an ISP. The server hardware system typically runs a commerce-server software such as IBM™ Websphere Commerce Suite Version 5.1 by means of which the auction mechanism, sellers agents 120, 121, . . . 120+m, and the buyer agents 110, 111, . . . 110+n, can be implemented.

At step 520, the sellers 130, 131, . . . 130+m instruct their respective agents 120, 121, . . . 120+m, by filling out forms displayed in their web-browsers, which originate from a commerce server running at the online auction sites 150, 151, . . . . The seller's instructions include information in respect of each item for sale, such as reserve price, initial offer price and a minimum price decrement. This information is passed to the seller agents 120, 121, . . . 120+m, implemented by way of a commerce server at an online auction site 150, 151, . . . .

When a buyer 100, 101, . . . 100+n (typically using a web-browser and a personal computer connected to the Internet) arrives at an auction web site 150, 151, . . . , the buyer searches for items of interest (typically by following appropriate "hyperlinks" and/or by filling out appropriate forms). If a buyer 100, 101, . . . 100+n finds an item of interest (Y), at condition step 530, the buyer 100, 101, . . . 100+n instructs a respective buyer agent 110, 111, . . . 110+n, at step 540. The buyer's instructions include information such as identification of items of interest to the buyer, the buyer's valuation/s of the item/s of interest, and an initial surplus amount in respect of each item.

If a buyer agent 110, 111, . . . 110+n is hosted at an auction site, as shown in FIG. 1, then the buyer agent can be implemented using the commerce server software running on the auction site hardware. In this case, the buyers 100, 101, . . . , 100+n provide instructions to their respective agents 110, 111, . . . 110+n, by filling out appropriate forms displayed on the buyers' web-browsers.

If the buyer agents 110, 111, . . . 110+n, are hosted elsewhere (say at buyer's personal computer), as shown in FIG. 2, then the agent can be implemented as a software using a generic programming language such as C/C++/Java/Perl etc. In this case, the buyer instructs its agent by giving appropriate input to the agent software running on the buyer's Pc.

Thereafter, the buyer's agent contacts the relevant seller's agent, either directly (in case of FIG. 1), or using a communication network (in case of FIG. 2), at step 550. Processing continues at condition step 560, where it is determined whether it is time for the auction to begin.

If no buyer 100, 101, . . . 100+n finds an item of interest (N), at condition step 530, processing continues at condition step 560, where it is determined whether it is time for the auction to begin.

If it is not yet time for the auction to begin (N), at condition step 560, processing reverts to condition step 530, thus permitting additional buyers to join the auction. The start time of the auction is typically specified by the auctioneer.

When the start time of auction is reached (Y), at condition step 560, processing continues at step 410 of the generic auction algorithm of FIG. 4. When the generic auction algorithm of FIG. 4 ends after auction closing, at step 4BO of FIG. 4, processing returns to step 570 of FIG. 5. At step 570, all the committed buyers and sellers transact in accordance with the offers committed to.

Figure 6:
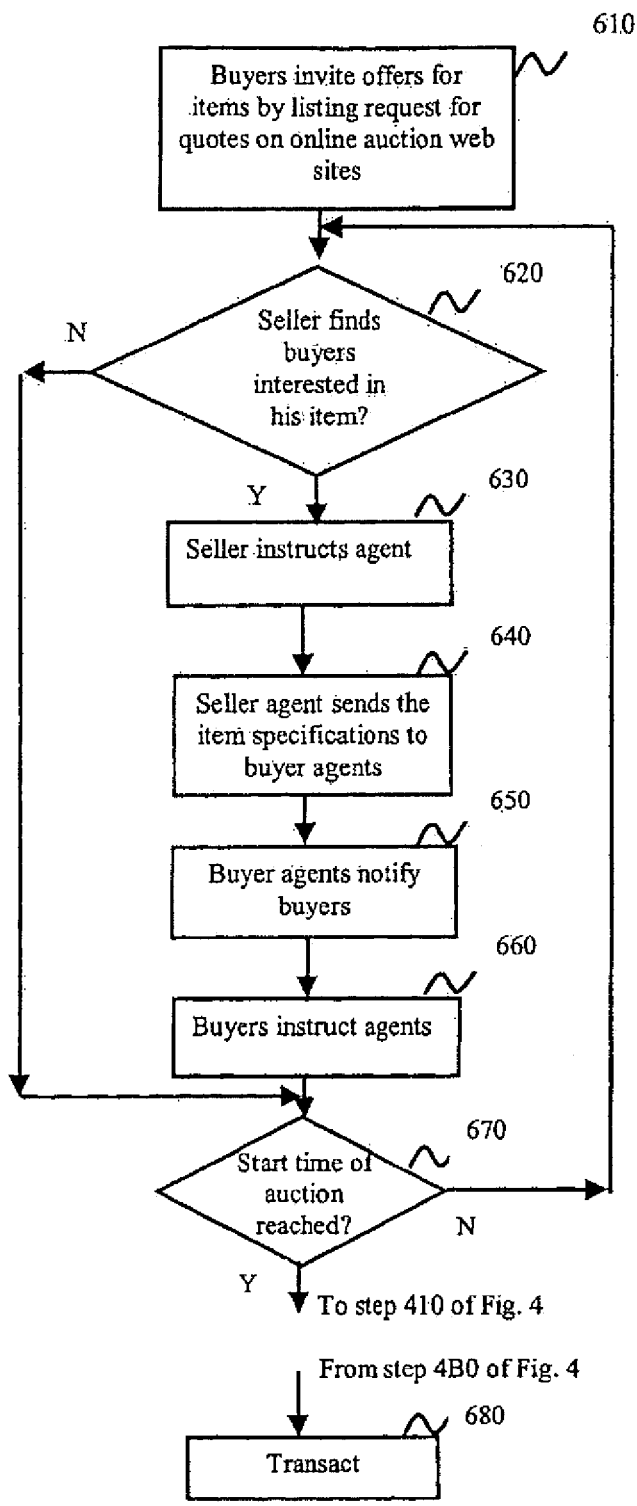
FIG. 6 is a flow diagram of an exemplary auction mechanism that can be practised with the system architecture of FIG. 3.

FIG. 6 is a flow diagram of an exemplary auction mechanism that can be practiced with the system architecture of FIG. 3.

At step 610, the buyers 100, 101, . . . 100+n list their intention to purchase one item from a specific class of items (e.g. used cars, airline tickets, hotel accommodation etc.) on online auction sites 150, 151, . . . and invite offers (request quotations) from the prospective sellers 130, 131, . . . 130+m. The buyers may follow conventional methods of web-browsing to list their intent to purchase. The invitations are published on online auction web sites 150, 151, . . . .

A buyer 100, 101, . . . 100+n can list an intention to purchase an item on an online auction site 150, 151, . . . using a world-wide-web browser on a personal computer (PC) with a modem, connected to the Internet using the services of an ISP. An online auction site 150, 151, . . . may be implemented using a server hardware system such as RS16000™, AS/400™ etc., connected to the Internet using services of an ISP. The server hardware system typically runs a commerce-server software such as IBM™ Websphere Commerce Suite Version 5.1 by means of which the auction mechanism, seller agents 130, 131, . . . 130+m, and buyer agents 110, 111, . . . 110+n can be implemented.

At condition step 620, a seller 130, 131, . . . 130+m browses the auction sites 150, 151, . . . typically using a world-wide-web browser on a personal computer (PC) with a modem connected to the Internet, to find buyers that may be interested in an item the seller wishes to sell. If the seller finds one more buyers 100, 101, . . . 100+n that may be interested in the item (Y), the seller 130, 131, . . . 130+m instructs a respective seller agent 120, 121, . . . 120+m, at step 630. The seller's instructions include information relating to specifications of the item of interest, an initial price for the item, a reserve price for the item, a minimum price decrement in respect of the item, and a list of buyer agents 110, 111, . . . 110+n corresponding to the buyers interested in the item.

If the seller agents 120, 121, . . . 120+m, are hosted at an auction site, then the seller agents can be implemented using the commerce server software. In this case a seller 130, 131, . . . 130+m, provides instructions to a respective agent by filling out an appropriate form displayed on the seller's web-browser.

If the seller agents 120, 121, '" 120+m, are hosted elsewhere (say, on a seller's personal computer), then the agents can be implemented in software, using a generic programming language such as C/C++/Java/Perl etc. In this case, a seller 130, 131, . . . 130+m instructs a respective agent by providing appropriate input to the agent software running on the seller's Pc.

Once a seller agent 120, 121, . . . 120+m has been instructed at step 630, the seller agent sends the item specifications to the interested buyer agents 110, 111, 110+n, at step 640. The item is typically offered to each buyer agent 110, 111, 110+n, individually.

When a buyer agent 110, 111, '" 110+n receives an item specification from seller agent 120, 121, 120+m, the buyer agent 110, 111, . . . 110+n notifies the respective buyer 100, 101, 100+n of the specification of the item, at step 650. The buyer agent typically notifies the corresponding buyer 100, 101, . . . 100+n, either by sending an email to the buyer's email address, or by listing the item specifications on the web-page corresponding to the buyer's listed intention to purchase.

The buyers 100, 101, . . . 100+n evaluate the item specification and instruct the respective buyer agents 110, 111, . . . 110+n, typically using a personal computer connected to the Internet, at step 660. The buyers' instructions include information regarding the buyers' valuation of the item and an initial surplus amount for the item.

At condition step 670, the software at the online auction site 150, 151, . . . determines whether the start time of the auction has been reached. If the start time has not yet been reached (N), processing reverts to condition step 620, thus permitting additional sellers 130, 130, . . . 130+m to join the auction.

If the start time of auction has been reached (Y), at condition step 670, processing continues at step 410 of the generic auction algorithm of FIG. 4. When the generic auction algorithm of FIG. 4 ends after auction closing, at step 4BO of FIG. 4, processing returns to step 680 of FIG. 6. At step 680, all the committed buyers and sellers transact in accordance with the offers committed to.

If a seller 130, 131, . . . 130+m, is unable to find a buyer 100, 101, . . . 100+n interested in his item (N), at condition step 620, the seller leaves the auction site and processing continues at condition step 670.

Generalization to Combined Diverse Seller and Buyer Methodologies

In practice, a combination of the architectures shown in FIGS. 2 and 3 may arise. Some of the sellers 130, 131, . . . 130+m might make their offers known by listing their items on known online auction sites 150 and 151. The number of online auction sites is not limited to two, however, and may extend to any convenient number. The online auction sites 150 and 151 also host the seller agents 130, 131, . . . 130+m, which follow a DPO strategy. Some other of the sellers 130, 131, . . . 130+m may search the communication network (Internet) for buyers 100, 101, . . . 100+n interested in their offers and send them offers individually. The agents of such buyers are typically hosted on the buyer's own personal computer systems or a computer system of the buyer's Internet Service Provider (ISP).

Similarly, some of the buyers 100, 101, . . . 100+n might make their intention to purchase an item, and request for offers, known on online auction sites 150 and 151. The auction sites 150 and 150 also typically host the software agents 110, 111, . . . 110+n of the buyers 100, 101, . . . 100+n, which follow an LSI strategy. Some of the other buyers 100, 101, . . . 100+n may search the communication network (Internet) for open offers and monitor item/s of interest, as the price/s of the item/s reduce, and follow an LSI strategy in accepting the offers.

Generalization to Multiple Heterogeneous Items

A buyer 100, 101, . . . 100+n may be interested in purchasing more than one item. Accordingly, a buyer 100, 101, . . . 100+n may accept more than one offer and may thus have more than one accepted offer at any given time. In this case, the buyer 100, 101, . . . 100+n informs a respective buyer agent 110, 111, . . . , 110+n about the buyer's preferences. A buyer agent 110, 111, . . . 110+n accepts a new offer if the new offer increases the total surplus of the buyer. Alternatively, a buyer agent 110, 111, . . . 110+n may accept a new offer and uncommit from one or more tentatively accepted offers, if doing so increases the buyer's surplus.

A seller 130, 131, . . . 130+m may have more than one item for sale. In this case, the seller 130, 131, '" 130+m instructs the corresponding agent 120, 121, . . . 120+m, accordingly. A seller agent 120, 121, . . . 120+m either offers the items one-by-one or offers all of the items all at once.

Computer Implementation

The auction mechanism/s and/or software-based agents for bidding may either be implemented as a standalone program running on the user's computer (client-side agents), subroutines that are a part of the auction web site (server-side agents) or as a software code which executes on a generic public infrastructure such as computer servers (third party agents).

Figure 7:
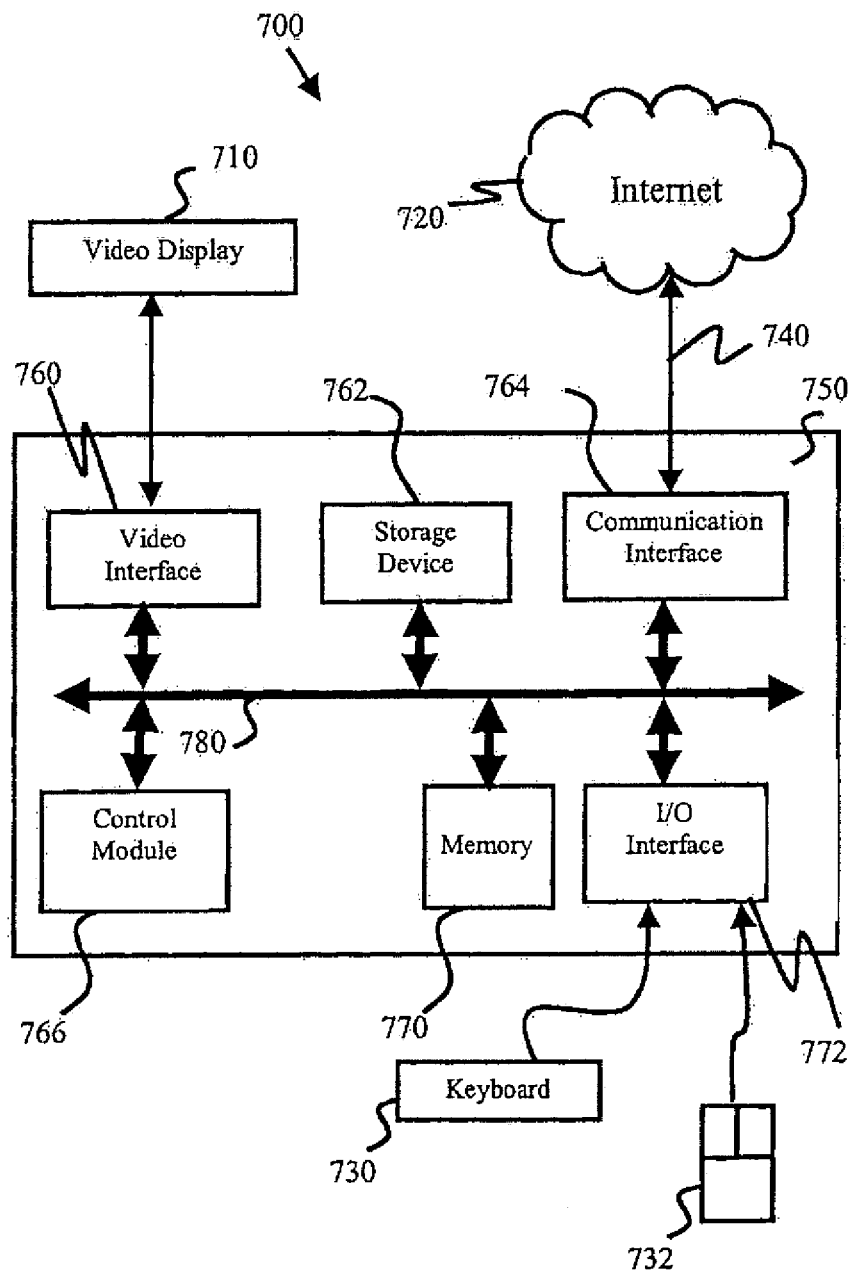
FIG. 7 is a block diagram of an exemplary computer system with which embodiments of the invention may be practised.

The auction mechanism/s and/or software-based agents can be implemented using one or more computer program product/s in conjunction with a computer system 700 as shown in FIG. 7. In particular, the auction mechanism/s and/or software-based agents can be implemented as software, or computer readable program code, executing on the computer system 700. The computer system 700 may comprise any commercially available computer system interconnected over a communication network. Examples of computer systems include personal computers (PCs) and servers like Netfinity™ and RS/6000™, ASI400™, S1390™ etc. sold by IBM™ and similar such servers sold by other companies.

The computer system 700 includes a computer 750, a video display 710, and input devices 730, 732. In addition, the computer system 700 can have any of a number of other output devices including line printers, laser printers, plotters, and other reproduction devices connected to the computer 750. The computer system 700 can be connected to one or more other computers via a communication interface 764 using an appropriate communication channel 740 such as a modem communications path, an electronic network, or the like. The network may include a local area network (LAN), a wide area network (WAN), an Intranet, and/or the Internet 720.

The computer 750 includes a control module 766, a memory 770 that may include random access memory (RAM) and read-only memory (ROM), an input/output (I/O) interface 772, a video interface 760, and one or more storage devices generally represented by the storage device 762. The control module 766 is implemented using a central processing unit (CPU) that executes or runs a computer readable program code that performs a particular function or related set of functions.

The video interface 760 is connected to the video display 710 and provides video signals from the computer 750 for display on the video display 710. User input to operate the computer 750 can be provided by one or more of the input devices 730, 732 via the I/O interface 772. For example, a user of the computer 750 can use a keyboard as input device 730 and/or a pointing device such as a mouse 732. The keyboard 730 and the mouse 732 provide input to the computer 750. The storage device 762 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 750 is typically connected to other devices via a bus 780 that in turn can consist of data, address, and control buses The method steps for the auction mechanism/s and/or the software-based agents can be effected by instructions in the software that are carried out by the computer system 700. Again, the software may be implemented as one or more modules for implementing the method steps.

In particular, the software may be stored in a computer readable medium, including the storage device 762 or that is downloaded from a remote location via the communication interface 764 and communications channel 740 from the Internet 720 or another network location or site. The computer system 700 includes the computer readable medium having such software or program code recorded such that instructions of the software or the program code can be carried out.

The computer system 700 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 766. Intermediate storage of the program code and any data including entities, tickets, and the like may be accomplished using the memory 770, possibly in concert with the storage device 762.

In some instances, the program may be supplied to the user encoded on a CD-ROM or a floppy disk (both generally depicted by the storage device 762), or alternatively could be read by the user from the network via a modem device connected to the computer 750. Still further, the computer system 700 can load the software from other computer readable media. This may include magnetic tape, a ROM or integrated circuit, a magneto-optical disk, a radio or infra-red transmission channel between the computer and another device, a computer readable card such as a PCMCIA card, and the Internet 720 and intranets including email transmissions and information recorded on Internet sites and the like. The foregoing are merely examples of relevant computer readable media. Other computer readable media may be practised without departing from the scope and spirit of the invention.

The auction mechanism/s and/or software-based agents can be realised in a centralised fashion in one computer system 700, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

Communication Network Implementation

A typical communication network may include any of nodes (routers/switches/hubs, satellite transponders, etc.), end-systems (such as computers, PDAs, mobile phones etc.), links (wired or wireless such as optical fiber, telecommunication lines, Ethernet cables, WLAN, infra-red links, microwave links, satellite links etc.) that provide a communication path from one node to one or more nodes/end-systems and from one end system to one or more nodes/end-systems.

Incorporations by Cross-Reference

"Simultaneous Online Independent Auctions with Discrete Bid Increments", by Bansal V. and Garg R., yet to be published in the Electronic Commerce Research Journal, is hereby incorporated herein in its entirety and accompanies this specification.

"Descending Price Multi-item Auctions", a confidential IBM Internal Report by Garg R. and Mishra D., is hereby incorporated herein in its entirety and accompanies this specification.

In the foregoing, a method, a system, and a computer program product for online auction of multiple heterogeneous items using software-based agents are described. While only a small number of embodiments are described, it will be apparent to those skilled in the art in view of this disclosure that numerous changes and/or modifications can be made without departing from the scope and spirit of the invention.

What is claimed is:

1. A system, comprising:
    at least one processor; and
    a memory storing computer executable instructions that, when executed by the at least one processor, perform a method, comprising:
    receiving, from a buyer, a respective buyer valuation for each of a plurality of items in a descending-price online auction, the plurality of items including a first item and a second item that is different from the first item;
    receiving, from a plurality of sellers that include a first seller and a second seller, respective prices for each of the plurality of items;
    automatically accepting, on behalf of the buyer and during the descending-price online auction, a first offer from the first seller to sell the first item to the buyer, the first offer corresponding to a first differential between a price of the first item and a buyer valuation of the first item;
    preventing, during the descending-price online auction, the first seller from offering the first item to other buyers after the accepting of the first offer;
    receiving, from the second seller during the descending-price online auction and after the accepting of the first offer, a second offer to sell the second item to the buyer;
    determining that the first differential is less than a second differential between a price of the second item and a buyer valuation of the second item;

automatically accepting, in response to the determining, the second offer on behalf of the buyer and during the descending-price online auction;

automatically rejecting, on behalf of the buyer, the first offer in response to the accepting of the second offer; and releasing, in response to the rejecting of the first offer, the first seller from being prevented to offer the first item to other buyers;

wherein one or more of the operations of the receiving the respective buyer valuation, the receiving the respective prices, the automatically accepting the first offer, the preventing, the receiving the second offer, the determining, the automatically accepting the second offer, the automatically rejecting the first offer, and the releasing are performed by one or more electronic agents.

2. The system of claim 1, wherein the descending-price online auction starts at a specified time and closes when no further offers are received for a specified period of time.

3. The system of claim 1, wherein the first and the second offers are communicated from at least one of computer systems, electronic terminals, personal digital assistants (PDA's), and mobile telephones.

4. The system of claim 1, further comprising instructions for preventing the second seller from offering the second item to the other buyers until the buyer has accepted a third offer.

5. The system of claim 1, wherein the buyer is free from being bound to any accepted offer until an ending of the descending-price online auction.

6. The system of claim 1, wherein the electronic agent is implemented in a programming language that is C, C++, Java, or Perl.

7. The system of claim 1, further comprising instructions for preventing the buyer from being committed to more than one offer at a same time during the descending-price online auction.

8. A method, comprising:
receiving, from a buyer, a respective buyer valuation for each of a plurality of items in a descending-price online auction, the plurality of items including a first item and a second item that is different from the first item;

receiving, from a plurality of sellers that include a first seller and a second seller, respective prices for each of the plurality of items;

automatically accepting, on behalf of the buyer and during the descending-price online auction, a first offer to buy the first item from the first seller to sell the first item to the buyer, the first offer corresponding to a first differential between a price of the first item and a buyer valuation of the first item;

preventing, during the descending-price online auction, the first seller from offering the first item to other buyers after the accepting of the first offer;

receiving, from the second seller during the descending-price online auction and after the accepting of the first offer, a second offer to sell the second item to the buyer;

determining that the first differential is less than a second differential between a price of the second item and a buyer valuation of the second item;

automatically accepting, in response to the determining, the second offer on behalf of the buyer and during the descending-price online auction;

automatically rejecting, on behalf of the buyer, the first offer in response to the accepting of the second offer; and releasing, in response to the rejecting of the first offer, the first seller from being prevented to offer the first item to other buyers;

wherein one or more of the receiving the respective buyer valuation, the receiving the respective prices, the automatically accepting the first offer, the preventing, the receiving the second offer, the determining, the automatically accepting the second offer, the automatically rejecting the first offer, and the releasing are performed by one or more electronic agents.

9. The method of claim 8, further comprising:
starting the descending-price online auction at a specified time; and
closing the descending-price online auction when no further offers are received for a specified period of time.

10. The method of claim 8, wherein the first and the second offers are communicated from at least one of computer systems, electronic terminals, personal digital assistants (PDA's), and mobile telephones.

11. The method of claim 8, further comprising preventing the second seller from offering the second item to the other buyers until the buyer has accepted a third offer.

12. The method of claim 8, further comprising allowing the buyer to remain unbound to any accepted offer until an ending of the descending-price online auction.

13. The method of claim 8, wherein the electronic agent is implemented in a programming language that is C, C++, Java, or Perl.

14. The method of claim 8, further comprising preventing the buyer from being committed to more than one offer at a same time during the descending-price online auction.

15. A non-transitory computer-readable storage medium storing computer-executable instructions that, when executed by a processor, perform a method, comprising:

receiving, from a buyer, a respective buyer valuation for each of a plurality of items in a descending-price online auction, the plurality of items including a first item and a second item that is different from the first item;

receiving, from a plurality of sellers that include a first seller and a second seller, respective prices for each of the plurality of items;

automatically accepting, by the buyer and during the descending-price online auction, a first offer from the first seller to sell the first item to the buyer, the first offer corresponding to a first differential between a price of the first item and a buyer valuation of the first item;

preventing, during the descending-price online auction, the first seller from offering the first item to other buyers after the accepting of the first offer;

receiving, from the second seller during the descending-price online auction and after the accepting of the first offer, a second offer to sell the second item to the buyer;

determining that the first differential is less than a second differential between a price of the second item and a buyer valuation of the second item;

automatically accepting, in response to the determining, the second offer on behalf of the buyer and during the descending-price online auction;

automatically rejecting, on behalf of the buyer, the first offer in response to the accepting of the second offer; and releasing, in response to the rejecting of the first offer, the first seller from being prevented to offer the first item to other buyers;

wherein one or more of the operations of the receiving the respective buyer valuation, the receiving the respective prices, the automatically accepting the first offer, the preventing, the receiving the second offer, the determining, the automatically accepting the second offer, the automatically rejecting the first offer, and the releasing are performed by one or more electronic agents implemented in C, C++, Java, or Perl.

16. The non-transitory computer-readable storage medium of claim 15, further comprising instructions for:
   starting the descending-price online auction at a specified time; and
   closing the descending-price online auction when no further offers are received for a specified period of time.

17. The non-transitory computer-readable storage medium of claim 15, wherein the first and the second offers are communicated from at least one of computer systems, electronic terminals, personal digital assistants (PDA's), and mobile telephones.

18. The non-transitory computer-readable storage medium of claim 15, further comprising instructions for preventing the second seller from offering the second item to the other buyers until the buyer has accepted a third offer.

19. The non-transitory computer-readable storage medium of claim 15, wherein the buyer is free from being bound to any accepted offer until an ending of the descending-price online auction.

20. The non-transitory computer-readable storage medium of claim 15, further comprising instructions for preventing the buyer from being committed to more than one offer at a same time during the descending-price online auction.

* * * * *